May 12, 1970    P. B. BURNHAM ET AL    3,511,543
HYDRAULIC CYLINDER CONTROLS FOR PRODUCING
CONFLUENT PRESSURE STREAMS
Filed Nov. 14, 1967    4 Sheets-Sheet 1
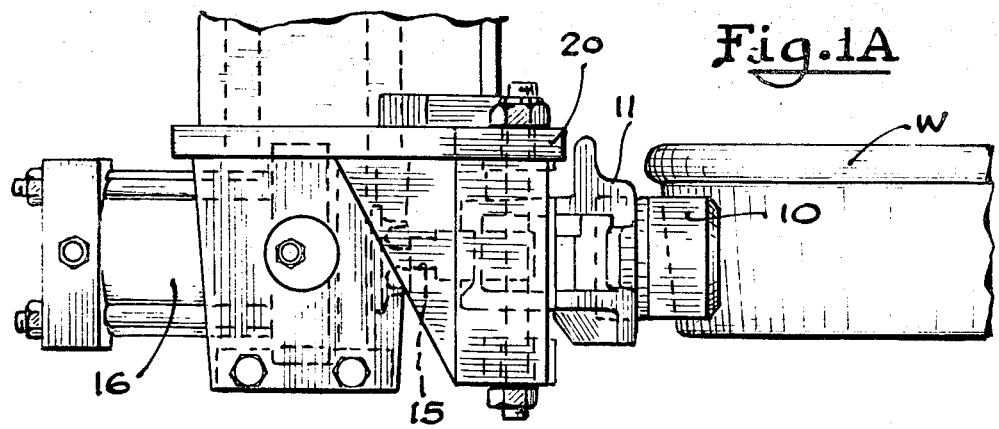
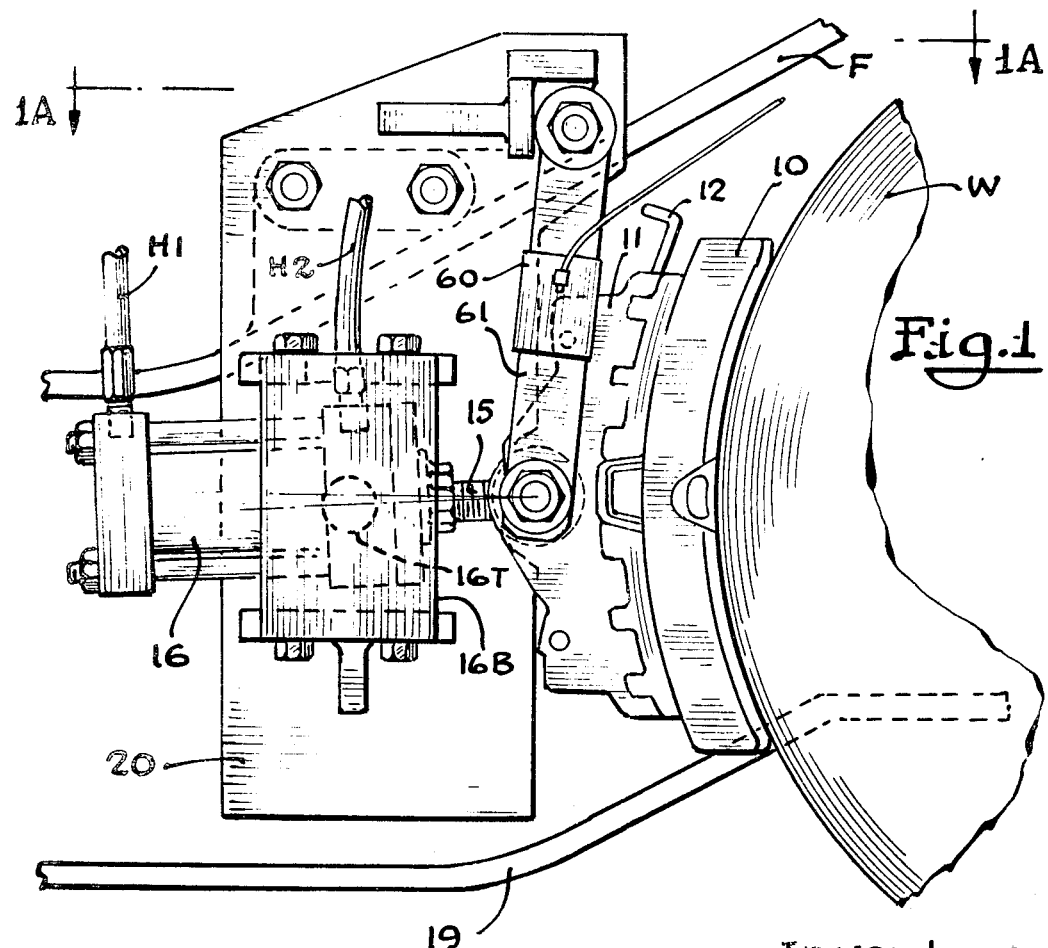
Inventors
Peter B. Burnham
Roger D. Jones
Grant H. Arrasmith
Paul E. Diedrich
James A. Simmonds
By *Wallace, Kinzer and Dorn*
Attorneys Inventors
Peter B. Burnham
Roger D. Jones
Grant H. Arrasmith
Paul E. Diedrich
James A. Simmonds
By Wallace, Kinzer and Dorn
Attorneys Inventors
Peter B. Burnham
Roger D. Jones
Grant H. Arrasmith
Paul E. Diedrich
James A. Simmonds
By Wallace, Kinzer and Dorn
Attorneys

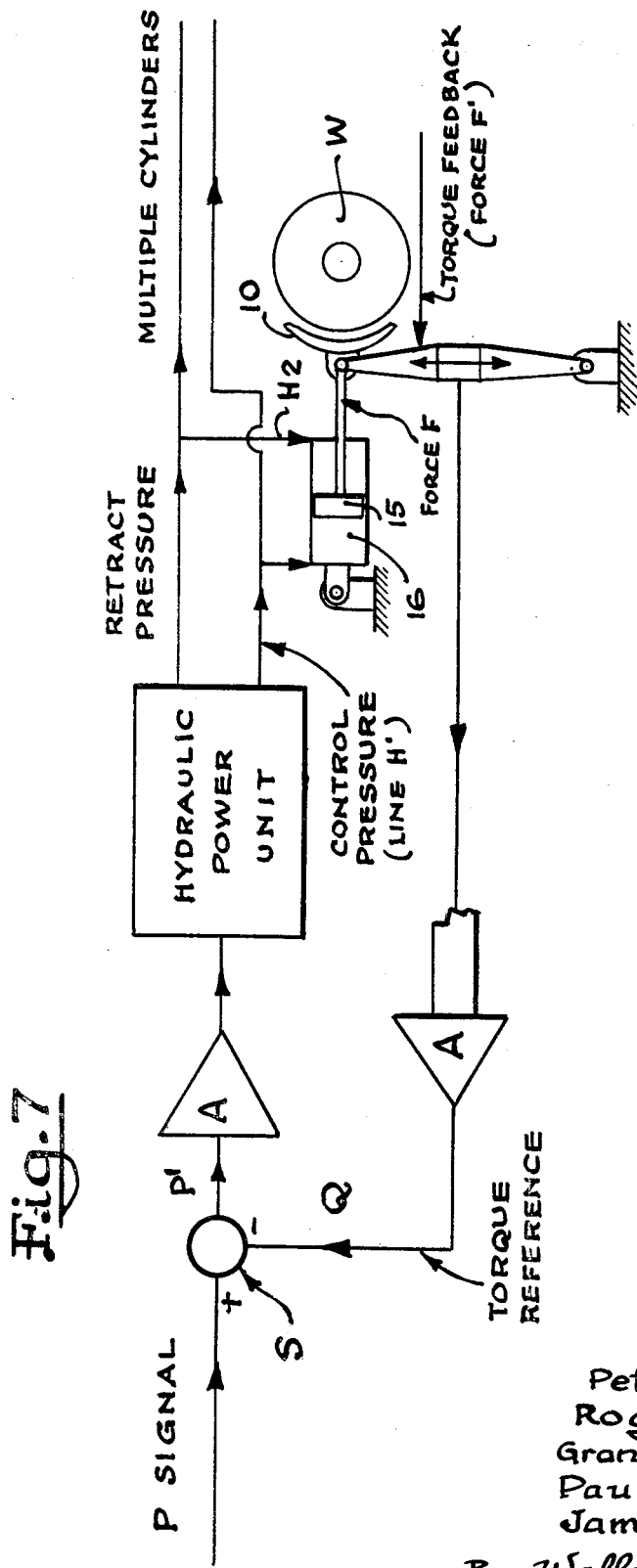

United States Patent Office 3,511,543
Patented May 12, 1970

3,511,543
HYDRAULIC CYLINDER CONTROLS FOR
PRODUCING CONFLUENT PRESSURE
STREAMS
Peter B. Burnham, Columbus, Roger D. Jones, Worthington, and Paul E. Diedrich, Columbus, Ohio, and Grant H. Arrasmith, Pearl River, and James A. Simmonds, Suffern, N.Y., assignors to Abex Corporation, New York, N.Y., a corporation of Delaware
Filed Nov. 14, 1967, Ser. No. 682,816
Int. Cl. B60t 15/42, 11/12
U.S. Cl. 303—62       21 Claims

ABSTRACT OF THE DISCLOSURE

A piston in a cylinder is adapted to be selectively advanced or retracted by fluid under pressure in two separate lines leading from a source of fluid under pressure. Extremely rapid advance of the piston is achieved by opening a normally closed flow-control valve so that fluid under pressure in both lines is simultaneously directed to the piston (head) end of the cylinder; and monitoring means are afforded for varying the applied force on the piston in response to demand for more or less piston pressure. Specifically, the arrangement is systemized in railroad brake apparatus so constructed as to enable the piston force to be effectively applied as a retarding force on a car wheel, and the retarding force is measured as an incident to implementing said monitoring means.

---

This invention relates to the operation of a piston by hydraulic power to specifically afford a rapid advance of a piston followed by constant feedback to assure that the force exerted by the piston conforms to predetermined requirements. The mode of reduction to practice hereinafter described is concerned with using the piston to force a railroad brake shoe into contact with the wheel of a car to exert deceleration forces. The requirement involved is one where the car or the train is to be brought to a stop within closer than usual tolerances. Consequently, it is of the essence that the braking system as a whole be promptly responsive to a signal calling for a train stop, and that there be means for constantly checking the retarding force to insure that the car or train will indeed be brought to a stop within the predetermined space limitations. The achievement of this is one of the principal objects of the present invention; and a related object is to develop a system which will enable this to be attained in a brake as well as in other modes of practice where it would be advantageous to promptly impart a fast forward stroke to a piston while monitoring its effectiveness and varying the applied force on the piston accordingly.

Thus, a brake is not the only apparatus in which the present invention may be employed. To the contrary, the system hereinafter described may be employed equally well to hydraulic presses and the like, especially of the tape controlled type, where operations of a machine tool are to conform to tape instructions. Under such circumstances, it may indeed be desirable to advance the piston of the press rapidly during the forward stroke; then, when resistance is encountered, to constantly determine whether there is any error in the pressure being applied incidental to proper performance of the work, an error detecting device being used to generate a signal which corrects for the error.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a fragmentary elevational view showing certain details of apparatus based on the present invention;

FIG. 1A is a top plan view on the line 1A—1A of FIG. 1;

FIG. 7 is a diagrammatic view illustrating error-responsive features of the invention.

Figure 2:
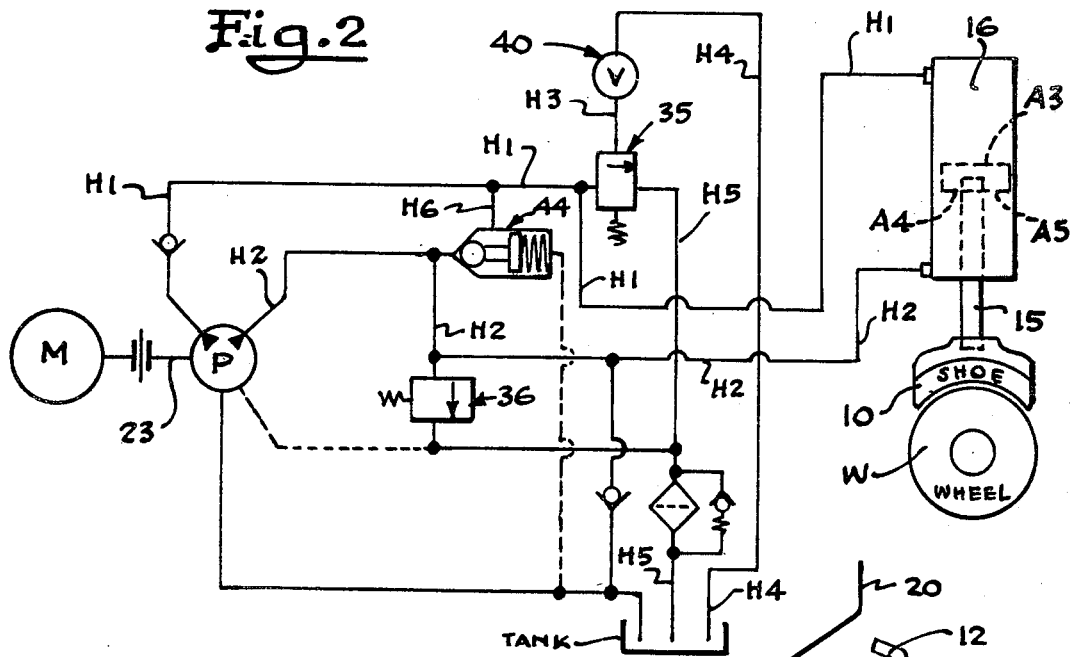
FIG. 2 is a diagrammatic view of the hydraulic circuit.

Referring to FIG. 1 of the drawings, one mode of practice of the invention is shown as involving a brake shoe 10 to be brought into friction contact with a wheel W of a railroad car. The shoe 10 may be of any desired standard form, typically carried on a brake head 11 and retained thereon by a removable key 12. The brake head is connected substantially at the medial portion at the back thereof on an extension 15 which is part of a hydraulically powered piston disposed within a related cylinder 16.

The brake shoe 10 and the support head 11 are, of course, located beneath the frame of the car, and this is equally true of the cylinder 16 and piston 15. The hydraulic pump and motor for driving the pump may be suspended beneath the car body in any desired fashion. The brake head 11 is pivotally supported at the end of the piston 15 and the cylinder is trunnion mounted at 16T to a support bracket 16B so that there may be conformance to the circumference of the wheel.

As will be explained in detail hereinafter, there is constant checking on the rate of deceleration during the course of brake action so that there can be compensation for any error representing lack of conformance to stopping the car within the required distance. Error detection is realized by measuring the torque being exerted on the shoe 10 by the wheel W during engagement between the shoe and the wheel. This may be accomplished in several different ways but preferably, FIG. 1B, we hand a link 17 on the joint between the piston 15 and the head 11 of the brake. The lower end of the link 17 is connected to an eye 18 at one end of a leaf spring 19 clamped by a bracket 19B in turn secured to a mounting plate 20 supported on frame F of the truck of the car.

Figure 1B:
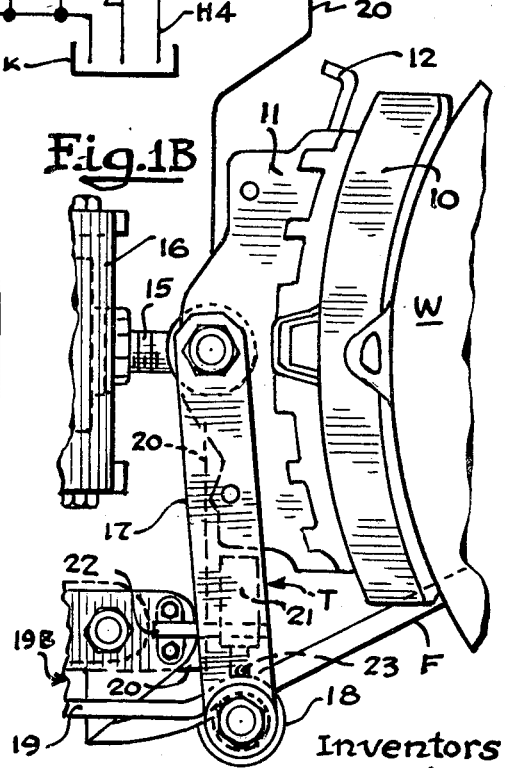
FIG. 1B is a view similar to FIG. 1 of a preferred form of practice under the invention.

A linear variable differential transformer T having a coil 21, FIG. 1B, is supported by a bracket 22 independently of the link 17. The core 23 of the transformer, arranged within the transformer coil, has its lower end secured for movement with the spring eye 18 upon deflection of the spring 19. In the course of braking, the link 17 will, of course, be subjected to a force proportional to the retarding force established on the wheel during braking, and there will be a slight stressing of the link 17 manifest in deflection of the spring 19. Concomitantly, deflection of the core 23 with respect to the coils 21 will change the induction coupling between the coils of the transformer. In other words, and assuming the presence of a transformer circuit, the output voltage of the transformer T will be proportional to the product of the force of the piston 15 and the coefficient of friction prevailing between the friction face of the shoe 10 and the opposed tread of the car wheel.

Figure 5:
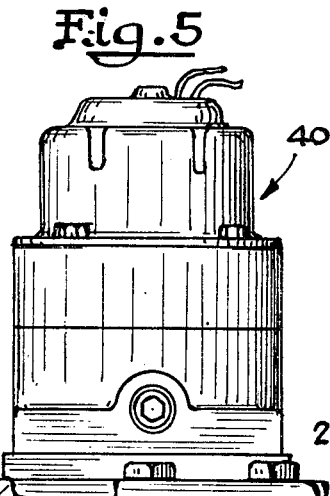
FIG. 5 is another view of the apparatus of FIG. 4, partly in section.

As shown schematically in FIG. 2, the hydraulic system for the brake includes a pump P having an input shaft 23 coupled to the output or drive shaft of a motor M. The pump of course is a source for fluid under pressure. One side or end of the housing for the pump P is recessed at 24, FIG. 5, and the opposite end is formed with a complemental collar or sleeve 25 so that as many pumps as may be necessary for applying forces to the shoes of a car may be arranged in tandem relation beneath the frame of the car with the collar 25 of one pump unit fitted in the recess 24 of the next pump unit. Thus, the pumps may be aligned and stacked end to end in a common housing (not shown) beneath the car body, and a single motor M is used to drive the drive shafts as 23 for the pumps; each shaft, as shown in FIG. 5, having a key 23K at one end and a corresponding locking socket 23S at the opposite end.

As shown in FIG. 2, each pump P supplies two hydraulic input lines H1 and H2. The hydraulic line H2 supplies the so-called rod end of the cylinder 16, so that pressure continuously may be exerted at the underside of the piston head, as for example when it is desired to retract the piston to displace the shoe 10 from the wheel W in which event the pressure in line H2 is greater than in H1. The other line H1 supplied by the pump P communicates with a relief valve 35, hereinafter described in more detail, and is normally (idle brake) connected to the tank or hydraulic reservoir through a line H5 as shown in FIG. 2. Under appropriate circumstances to be described, hydraulic fluid under pressure in line H1 is directed to the head end of the cylinder 16 incidental to inducing forward or advancing movement of the piston to establish contact between the shoe and the wheel.

It should further be noted that line H1 is a high pressure line from the pump, assumed to be one gallon per minute for purposes of the present disclosure. On the other hand, line H2 of the pump is of low pressure, having a capacity of two gallons per minute up to 250 p.s.i. A relief valve 36 is in communication with line H2, and for purposes of disclosure herein it is assumed that relief valve 36 is set to open at 180 p.s.i.

RELIEF VALVE 35

A significant and essential component of the hydraulic system is a relief valve 35, FIGS. 2 and 3, which is normally vented, as hereinafter described in more detail, when the piston and shoe 10 are in a relaxed or retracted state. The valve 35, as shown in FIG. 2, communicates with hydraulic line H1.

Figure 3:
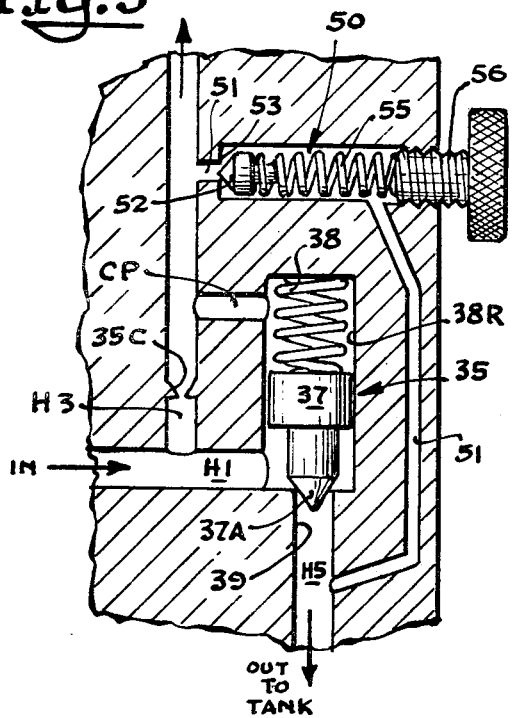
FIG. 3 is a detail sectional view of a valve.

As shown in FIG. 3, valve 35 includes a poppet 37 engaged at the head end thereof by a spring 38 confined in a recess 38R as shown. The opposite or orifice controlling end 37A of the poppet 37 is tapered and may be positioned in a valve closing position or orifice 39. At the upstream end of the poppet 37, there is a by-pass line H3 in communication with line H1, and an orifice 35C is located within the by-pass line H3. The by-pass line H3 communicates with a pressure control valve 40, FIGS. 2 and 4, as hereinafter described. When valve 40 is open, in a venting state, fluid is passed therethrough to line H4, FIG. 2, which leads to the tank or reservoir.

Communicating with the by-pass line H3 is a control passage CP which in turn communicates with the chamber or recess 38R in which the spring 38 is located as will be apparent in FIG. 3. In the position shown in FIG. 3, poppet 37 is closed on seat 39, which will account for fluid under high pressure in input line H1 being directed to the head end of cylinder 16 to advance piston 15. In a second or wide open position, poppet 37 is fully retracted from the seat 39, and line H1 is drained to line H5 connected to the tank or reservoir. Minimum pressure then prevails in line H1. At intermediate positions, the tapered end 37A of poppet 37 meters orifice 39 more or less, varying the pressure in line H1.

PRESSURE CONTROL VALVE 40—VARIABLE RESTRICTION TYPE

The pressure control valve 40 plays a significant role in the attainment of a rapid advance of the piston, when there is a signal calling for piston advance.

Figure 4:
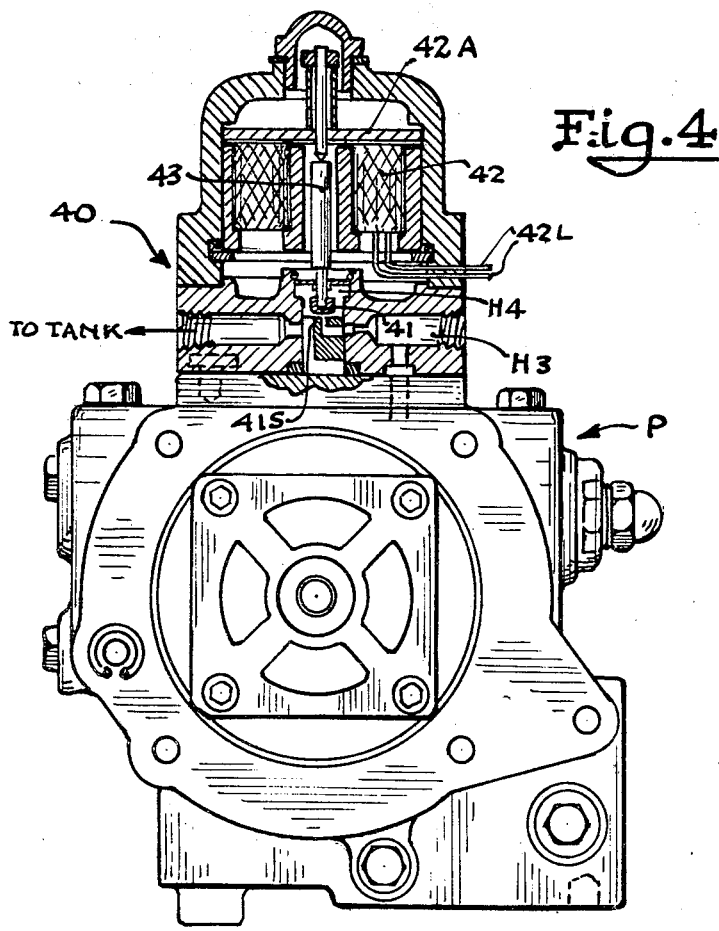
FIG. 4 is an elevational view, partly in section, of a pump and valve.

Referring to FIG. 4, the valve 40 specifically includes a poppet 41 adapted to seat in a valve closing position on corresponding valve seat 41S. The valve 40 is under the control of an electromagnetic coil 42, and in turn the coil 42 is adapted to be energized through leads 42L when either a basic brake applying signal or an error signal is established as hereinafter described.

The poppet 41 is moved by a stem 43 in contact therewith, which in turn is moved by an armature 42A. Fluid pressure in line H3 will be enough to hold the poppet 41 off its seat, venting line H3 to line H4, but such venting will be restricted and may be altogether stopped upon energization of coil 42 causing armature 42A to press poppet 41 in a restricting sense relative to the valve seat 41S. So long as coil 42 is de-energized, valve 40 may be considered to be wide open in that any appreciable pressure in line H3 will hold poppet valve 41 fully off its seat 41S. Depending upon the strength of the magnetic field, when coil 42 is energized, the force of the armature 42A, tending to seat poppet 41, will be opposing the pressure in line H3 tending to move the poppet fully off the drain seat 41S, and hence the extent to which line H3 is vented at this time is variable. Thus, valve 40 is of the variable restriction type, variable in proportion to the strength of the field of coil 42 to vary the rate of flow through vent line H3, and the importance of this will be explained below.

REGENERATION CONTROL CHECK VAVLE 44

Figure 6:
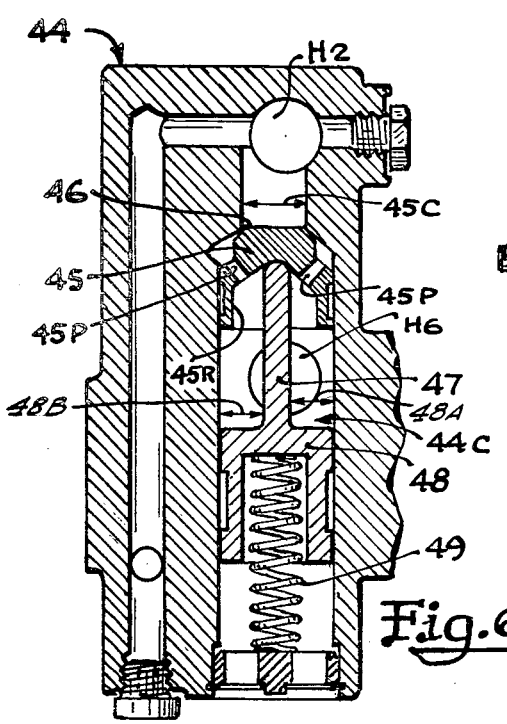
FIG. 6 is a fragmentary sectional view of another valve.

As shown in FIG. 2, valve 44 is adapted to communicate line H2 with a separate by-pass line H6 which leads to line H1. Valve 44 is illustrated in detail in FIG. 6 and includes a poppet 45 normally closed on a seat 46 within a chamber 44C formed within the housing of valve 44. Chamber 44C communicates both with line H2 and line H6 as shown in FIG. 6. Poppet 45 is ported at 45P. The rear face of the poppet 45 is recessed at 45R to accommodate the reduced rod or stem 47 of a spring-biased piston 48, the piston 48 at the opposite end of the stem being recessed to accommodate a coil spring 49. The combined valve elements 45–48 of valve 44 may therefore be viewed as a poppet and piston connected only in compression.

In the chamber 44C of the valve housing accommodating the piston 48, there is an opening, FIG. 6, corresponding to line H6 described above as being in communication with line H1. The spring 49 is strong enough to hold the poppet 45 in closing position on the seat 46, FIG. 6, at 180 p.s.i. assumed to be normally prevailing in line H2, when line H1 is open to the tank.

It should also be noted in connection with valve 45 that the effective piston area 48A plus 48B exposed to pressure in line H1–H6 at the popet or stem side of the piston 48 is larger than the effective area 45C at the seating end of the poppet 45 exposed to pressure in line H2. Thus, the combined valve element 45–48 in one sense is a relief valve, differentially sensitive to outlet pressure, but nevertheless one which controls flow much in the nature of a check valve as will become apparent from the further description to follow.

OPERATION: IDLE BRAKE

Between train stops, the piston 15 is retracted to the position illustrated in FIG. 2. The motor M is driving the pump P at all times, and in the relaxed or retracted state of the piston hydraulic fluid is being pumped by the pump P through input lines H1 and H2. Incorporated in valve 35 is a pilot stage valve 50 interposed in a pilot line 51 which interconnects lines H3 and H5. Valve 50 includes a poppet urged by a spring 55 toward seat 53 on the side of line 51 correspondinging to the vent line H3. Spring 55 is regulated by an adjusting screw 56. Screw 56 may be backed off to completely relax spring 55, but is ordinarily set to establish a pressure slightly above the maximum emergency brake pressure. Any excess pressure will open poppet 52, and fluid will be drained to line H5 through the drain line 51 to maintain pressure at the established maximum.

In any event, when the fluid in the line H1 reaches orifice 35C, FIG. 3, there is a pressure drop across this orifice with reduced pressure conditions established in the chamber 38R where spring 38 is located. There is a higher pressure in line H1 on the poppet side of the spring, whereby the poppet 37 is moved off the seat 39 communicating lines H1 and H5 so that fluid under pressure in line H1 is merely pumped to the tank, FIG. 2, though line H5. Actually, the poppet 37 may be moved to its open position, off the seat 39, by a minimum pressure of about 20–40 p.s.i. prevailing in line H1, this condition existing when line H3 is open to the tank.

Assuming, has already been described, that relief valve 36 is set for 180 p.s.i., pressure in line H2 may be higher than the pressure in line H1. Thus, there will be sufficient pressure in line H2 supplied to the cylinder 16 at the rod end thereof, to hold the piston in its retracted or relaxed state during the time that the brake is idle. The actual differential in pressure is the difference in pressure settings of the fixed relief valve 36 and that of the vented condition of valve 35.

OPERATION: BRAKING SIGNAL APPLIED

It may be assumed that a signal to apply the brakes is effective through electric leads 42L, FIG. 4, causing energization of coil 42. The signal thus applied for initiating brake action is of maximum strength so far as coil 42 is concerned. Energization of coil 42 is manifest in the armature 42A being forced downward as viewed in FIG. 4 effective to exert a full holding force on the stem 43 holding the poppet 41 firmly on its seat, thereby preventing any venting through the by-pass line H3. Thus, back pressure is established in line H3, and the pressure differential across orifice 35C effectively disappears. As pressure builds up in passages H3–CP, poppet 37 snaps shut because of the larger area at the head end of the poppet compared to the underside of the head of the poppet, dis-establishing communication between lines H1 and H5. Thus, when the vent line H3 is closed upon operation of the armature 42A, pressure tends to be equalized on both sides of the poppet 37, and it will be recognized that the operation of poppet 37 as thus described characterizes a differential area pilot operated relief valve.

With the poppet 37 closed on seat 39, fluid under pressure in line H1 is transmitted directly to the head end of the cylinder characterizing initiation of forward movement of the piston 15. Pressure in line H1 thus increases, especially in view of the back pressure in line H3 and the frictional resistance encountered as well as the opposing 180 p.s.i. pressure condition prevailing in line H2 at the rod end of the cylinder at this time. The increase in pressure in line H1 is communicated through line H6 to the interior of valve 44.

Referring to FIG. 6, the higher pressure now prevailing in line H1 (say 175 p.s.i.) is communicated through line H6 to the exposed circular area of the piston 48. As a consequence, piston 48 is shifted against the bias of spring 49, releasing stem 47 from its holding action at the rear face of the poppet 45. Having removed the holding force of stem 47 from the rear of the poppet 45, pressure in line H2 now moves the poppet 45 off its seat 46 and pressure is practically equalized in lines H1 and H2 at some value less than 180 p.s.i. As a consequence, fluid under pressure flows past seat seat 46, through the ports 45P in poppet 45, through line H6 and merge with the fluid under pressure being delivered through line H1 to the head end of the cylinder 16. At the same time line H2, in the portion communicating with the rod end of the cylinder 16, now is effectively drained through valve 44 back to the head end of the piston 15 in cylinder 16. The flow around this portion of the circuit (H1–H2–44–H6–H1) is greater than the capacity of the pump; and valve 36 remains closed because the pressure in this portion of the circuit remains less than 200 p.s.i.

Therefore, when the brake signal is applied to the operating coil 42 of the vent valve 40, all pressure lines are in effect in comunication with the head end of the cylinder 16 at a common pressure. A very rapid advance is effected; the rate of which is calculated to be the combined pump flow rate in volume per unit of time divided by the cylinder rod area. Should friction be greater or less than normally encountered the pressure setting of valve 36 may be adjusted up or down to cause the necessary force application to achieve rapid advance.

When the shoe 10 engages wheel W, pressure necessarily builds up rapidly in line H1 at the head of cylinder 16 to an even greater extent, since no further movement of piston 15 can take place, although force can be varied, as indeed may be required in the course of error detection as hereinafter explained.

In any event, upon engagement of shoe 10 with wheel W, pressure builds up in line H1 at the head end of the cylinder 16 and tries to build up at the rod end; but when the pressure at the two ends of the cylinder reaches the setting of valve 36, the latter opens. Further pressure build-up in H1 is communicated to the interior of valve 44 through line H6 in excess of the pressure applied to the forward end of the poppet 45, through line H2 and a flow reversal would result, but poppet 45 is thereupon seated. With poppet 45 thus seated, the pressure in line H1 can build up in excess of that which would normally open relief valve 36.

Assuming then that the car has been effectively stopped within the required distance, or assuming in other circumstances that the piston 15 has completed the required effort, return of the piston is to be effected. Manifestly the signal applied to the coil 42 disappears characterizing completion of the desired operation, and the holding force on armature 42A is released. Poppet 41 is no longer held by the positive force of armature 42A, so that valve 36 is returned to its normal venting state, effective to vent line H3.

Concomitantly a large pressure differential is once more established across orifice 35C. With less pressure in the chamber where the spring 38 is confined, poppet valve 37 is shifted upward as viewed in FIG. 3 by the higher pressure prevailing in line H1. Seat 39, FIG. 3, is opened, and line H1 is communicated once again with line H5 leading to the tank, which means in effect that the head end of the cylinder is now in communication with the tank or reservoir and pressure in line H1 may be assumed to be of the order of 20–40 p.s.i.

At intermediate pressures in chamber 38R, between the extremes of full vent and full shut conditions at valve 40, spring 38 will be opposing the pressure in line H1 tending to force poppet 37 to a full open position, and hence the metering end 37A of the poppet 37 may more or less restrict seat 39.

In the meantime, relief valve 36 remains effective to maintain a pressure of about 180 p.s.i. in line H2, and this pressure is communicated through line H2 to the rod end of cylinder 16 causing retraction of the shoe from the wheel.

ERROR DETECTION

A block or schematic diagram simplifying components of the system described above is set forth in FIG. 7 where the present invention is embodied in brake apparatus for a train, particularly a train of the so-called mass transit type operating at high speeds over relatively short distances so far as repeated stops between stations may be concerned. Particularly in the instance of commuter traffic in urban areas intended for precise stopping to facilitate both passenger loading and unloading, stopping of the train must be within rather precise tolerance allowances of not more than one or two feet on either side of the loading platform or gate. In such transit systems, the train will be controlled almost entirely by a computer system wherein the control computer will cause the generation of a so-called P signal, FIG. 7, which may be assumed to be of +1 value commanding full braking in terms of pounds of retarding force per pound of car weight. The P signal is directed to a summation network S, FIG. 7, which is no part of the present invention, and this signal may be viewed as transmitted directly to the control coil 42 of valve 40. Valve 40 closes tight, altogether preventing venting of the relief valve 35. The relief valve 35 snaps shut, resulting in delivery of fluid under pressure to cylinder 16 through hydraulic line H1 as described above.

Cylinder 16, through piston 15 and shoe 10, then exerts a normal force on the wheel W of the car of the train to which shoe 10 is related causing a retarding force to be exerted on the wheel in full compliance with signal P. The product of this normal force, F, and the coefficient of friction between the shoe and wheel is exerted on link 17, FIG. 1B, and may be viewed as force F', FIG. 7, sensed by a semi-conductor load cell, FIG. 1, or a linear variable differential transformer, FIG. 1B, which itself then generates a signal amplified to Q, proportional to force F'. Signal Q may be viewed as one of minus (—) value. Signal Q is directed back to the summation unit S, FIG. 7. If the analog signal Q is equal to signal P, such manifests that the brake system is effecting deceleration as required; the hydraulic system, FIG. 2, continues to function as demanded and eventually the train will be brought to a full stop precisely as demanded by the original P signal from computer control.

What has just been stated is the theoretical or ideal state, because the friction coefficient conditions at the time of braking will seldom if ever comply with the ideal state. Indeed friction coefficient for example tends to increase with decreasing speeds as is well known in the art, and the friction coefficient also varies with changes in temperature as well as the wetness of the shoe. Thus, as the train slows from a high speed, the friction coefficient increases, and in the event of wet weather the coefficient of friction decreases, so that signal Q in nearly all instances will represent a departure from signal P resulting in the generation of an error signal P', FIG. 7, emitted from the summation unit S. This error signal, greatly amplified, will modulate coil 42 manifest in poppet 41, FIG. 4, either being held completely closed, on its seat 41S (no venting) or allowing it to fully open (full venting) or modulate it in between so far as concerns the rate of flow of fluid in line H3 through valve seat 41S. Pressure in line H1 may therefore be held at maximum, applying maximum retarding force or it may be reduced more or less depending upon the extent to which valve element 41 restricts orifice 41S for more or less venting, in turn manifest in the relief poppet 37 varying the effective opening at valve seat 37A.

In other words, signal Q is in effect a monitoring signal indicating the level of retarding force; and poppet 41 proportions the pressure drop in line H3 to which relief valve poppet 37 is in turn responsive to proportion the pressure in line H. The condition always exists that P minus Q equals P'. On initial brake command, Q is equal to zero and P' approaches P causing a large pressure to be applied to the head end of cylinder 16. As pressure increases in line H1, Q rises and P' becomes less. Valve 40 is varied accordingly. A steady state condition will be reached where P' is diminished to some small value for any value of P. The value of P' will be determined by the circuit amplification, FIG. 7; the higher the gain, the more closely Q will approximate P which is the aim.

The present invention may of course be employed in apparatus other than brak apparatus, and indeed can be imposed in any system presenting a working piston operated by fluid under pressure where it is desired to establish a rapid forward stroke when lightly resisted and automatically switching to a forceful slower stroke when resistance is encountered.

The feed-back device in the form of a linear variable transformer T may be supplanted if desired by a strain gauge 60, FIG. 1, mounted on a link 61 having one end anchored to the support plate 20 and the opposite or lower end anchored to the pivotal support afforded for the supporting head 11 of the shoe 10. It will be appreciated that the link 61 will undergo stresses as the result of torque exerted on the shoe 10 during the course of a brake action so that the strain gauge 60 will generate a current proportional to the torque on the shoe during braking, fully equivalent to the arrangement illustrated in FIG. 1B.

It will be seen from the foregoing that the two input lines H1 and H2 for the cylinder are adapted to be placed in communication with one another as an incident to advancing or forward movement of the piston from a retracted or idle position. Forward movement of the piston commences upon closure of the relief valve 35, the latter in turn being closed in response to closure of vent line H3; and vent line H3 closes in response to a command signal manifest in closure of valve 40. As pressure builds up in line H1 at the inception of a forward stroke of the piston, this build-up of pressure prevails within valve 44 resulting in unseating of the poppet 45, and it is this action which places the two input lines, H1 and H2, in communication with one another for confluent delivery to the cylinder to thereupon produce a rapid forward stroke of the piston, especially since at this time the rod end of the cylinder is drained through open valve 44.

Applied torque at the time of braking is sensed or monitored by link 17 and the sensing element (transformer or strain gauge) attached thereto. If the retarding force is too high or too low, valve 40 is opened or closed by an appropriate amount, and likewise valve 35. Thus valve 40 becomes an amplifier which, by controlling the rate of bleeding or venting of line H3, accordingly varies the effective size of the orifice 39 in valve 35, FIG. 3, which drains line H1. In other words, valve 40 controls the pressure drop across the pressure responsive poppet 37, and the later meters orifice 39 proportionally.

We claim:
1. A cylinder presenting a piston having a head at one end and a rod at the other end operated by fluid under pressure, means affording a first input line for supplying fluid under pressure from a source to the head end of the cylinder when the piston is to be advanced, means affording a second input line for supplying fluid under pressure from said source to the rod end of the cylinder when the piston is to be retracted, a relief valve in communication with the first input line, said relief valve having a valve element effective in a first position to permit draining of the first input line to allow the piston to be retracted and effective in a second position to permit delivery of fluid under pressure in the first input line to the head end of the cylinder to advance the piston against the resistance of fluid in the rod end of the cylinder resulting in an increase of pressure in the first input line, and a control valve connected to both input lines, said control valve having a normally closed valve element effective to block communication between the input lines where there is a low pressure in the first input line, and means responsive to said increase of pressure in the first input line at the inception of advancing piston movement to open the valve element of the control valve thereby communicating the second input line with the first input line so that fluid under pressure in the second input line joins that in the first input line for confluent delivery to the head end of the cylinder resulting in rapid advance of the piston.

2. Apparatus according to claim 1 wherein the rod end of the cylinder is drained to the first input line, through the control valve, at the time of confluent delivery.

3. Apparatus according to claim 1 wherein the relief valve includes a chamber in which is located a spring-biased tapered poppet for variably restricting a seat which communicates the first input line with a drain line, said poppet of the relief valve being of the differential area pressure responsive type, a vent line in communication with said chamber and the upstream end of said first input line, and means in said vent line for establishing a pressure drop across the relief poppet to control the poppet between full closed and full open positions.

4. Apparatus according to claim 3 in which the last-named means includes a control valve controlling an orifice between full vent and non-vent states.

5. Apparatus according to claim 4 in which the last-named means includes a valve element controlled electromagnetically.

6. Brake apparatus comprising a cylinder presenting a piston having a head at one end and a rod at the other end operated by fluid under pressure, said piston being adapted to apply a retarding force to a brake shoe or the like to exert the retarding force on a wheel, means affording a first input line for supplying fluid under pressure from a source to the head end of the cylinder when the piston is to be advanced to press the shoe against the wheel, means affording a second input line for supplying fluid under pressure from said source to the rod end of the cylinder when the piston is to be retracted to withdraw the shoe from the wheel, a relief valve in communication with the first input line, said relief valve having a valve element effective in a first position to permit draining of the first input line to allow the piston to be retracted and effective in a second position to permit delivery of fluid under pressure in the first input line to the head end of the cylinder to advance the piston against the resistance of fluid in the rod end of the cylinder resulting in an increase of pressure in the first input line, and a control valve connected to both input lines, said control valve having a normally closed valve element effective to block communication between the input lines when there is a low pressure in the first input line, means responsive to said increase of pressure in the first input line at the inception of advancing piston movement to open the valve element of the control valve thereby communicating the second input line with the first input line so that fluid under pressure in the second input line joins that in the first input line for confluent delivery to the head end of the cylinder resulting in rapid advance of the piston for prompt braking.

7. Brake apparatus according to claim 6 wherein the relief valve modulates an orifice which communicated said first input line with a drain line whereby the amount of pressure in the first input line is a function of the effective size of the modulated orifice, means responsive to a signal to control the position of the relief valve, and means for establishing such a signal proportional to brake torque.

8. Brake apparatus according to claim 7 wherein the signal responsive means is an electromagnetically controlled valve element for variantly regulating a drain orifice in a vent line communicating with the relief valve.

9. In hydraulic apparatus of the kind described including a cylinder presenting a piston having a head at one end and a rod at the other end, an input line adapted to supply fluid under pressure to the rod end of the cylinder to move the piston to a retracted position, another input line adapted to supply fluid under pressure to the head end of the cylinder to advance the piston, a normally closed flow control valve having connections to both input lines so that said input lines are in communication one with the other only when said valve is in an open position, pump means connected to both lines for supplying both lines simultaneously with fluid under pressure and means to open said valve in response to build-up of pressure in the other input line at the time of piston advancement so that fluid under pressure in the first-named input line flows through said valve to merge with that in the other input line for confluent delivery to the head end of the cylinder to produce rapid forward movement of the piston.

10. In hydraulic apparatus of the kind described where a force is exerted through a piston in a cylinder and wherein the piston is to be actuated in either an advancing or retracting direction as determined by the flow of fluid under pressure through the cylinder, a piston advance input line and a piston retract input line for fluid under pressure respectively connected to opposite ends of the cylinder, each of said lines being connected to a pump for supplying both lines simultaneously with fluid under pressure, valve means operative in one position to establish pressure in the piston advance line lower than that in the piston retract line when the piston is to be retracted and operative in a second position to establish higher pressure in the piston advance line when the piston is to be advanced, a normally closed flow-control valve connected to both lines and adapted when open to enable fluid under pressure in the piston retract line to be communicated augmentatively to the piston advance input line, and pressure responsive means to open the flow-control valve at a predetermined high pressure in the piston advance line.

11. Hydraulic apparatus according to claim 10 in which the first-named valve has intermediate positions for varying the pressure in the piston advance line between extremes of low and high pressure, and means rendering the first-named valve responsive to a demand for a predetermined amount of force to be applied by the piston.

12. In a hydraulically operated brake apparatus where the retarding force is exerted by a piston in a cylinder and wherein the piston is to be actuated in either an advancing or retarding direction as determined by the flow of fluid under pressure through the cylinder, a piston advance input line and a piston retract input line for fluid under pressure respectively connected to opposite ends of the cylinder, means to supply both lines simultaneously with fluid under pressure, valve means operative in one position to establish pressure in the piston advance line lower than that in the piston retract line when the piston is to be retracted and operative in a second position to establish higher pressure in the piston advance line when the piston is to be advanced, said valve having intermediate positions for varying the pressure in the piston advance line between extremes of low and high pressure, a normally closed flow-control valve connected to both lines and adapted when opened to enable fluid under pressure in the piston retract input line to be communicated to the piston advance input line, and signal responsive control means rendering the first-named valve responsive to a demand signal for a predetermined amount of retarding force to be applied by the piston.

13. Brake apparatus according to claim 12 including means to measure the effectiveness of the retarding action of the piston and to transmit a corresponding signal to said control means.

14. Brake apparatus according to claim 13 in which the cylinder is pivotally supported and in which the head for a railroad brake shoe is secured to the piston.

15. Brake apparatus comprising a cylinder having a pivotal support, a piston in the cylinder responsive to fluid under pressure in the cylinder, a brake head secured to the free end of the piston, a link secured to the brake head to be stressed therewith during application of the brake, and means to measure the stress of the link.

16. Brake apparatus according to claim 15 including means to regulate the flow of fluid to the cylinder in response to the measure.

17. In hydraulic apparatus of the kind described including a cylinder presenting a piston having a head at one end and a rod at the other end, an input line adapted to supply fluid under pressure to the rod end of the cylinder to move the piston to a retracted position, another input line adapted to supply fluid under pressure to the head end of the cylinder to advance the piston, a normally closed flow control valve having connections to both input lines so that said input lines are in communication one with the other only when said valve is in an open position, means for supplying both lines simultaneously with fluid under pressure, and means to open said valve in response to build-up of pressure in the other input line at the time of piston advancement so that fluid under pressure in the first-named input line flows through said valve to merge with that in the other input line for confluent delivery to the head end of the cylinder to produce rapid forward movement of the piston, said valve including a poppet normally closed on a seat exposed to the pressure in the first-named input line, said poppet being urged to a closed position by a poppet piston having a reduced stem normally bearing on the poppet, a spring acting on the head of the poppet piston, said poppet piston being within a chamber with the stem side thereof exposed to the pressure in said other input line, the area at the stem end of the poppet piston exposed to pressure in said other input line being greater than the area of the poppet exposed to pressure in the first-named input line.

18. In hydraulic apparatus of the kind described including a cylinder presenting a piston having a head at one end and a rod at the other end, an input line adapted to supply fluid under pressure to the rod end of the cylinder to move the piston to a retracted position, another input line adapted to supply fluid under pressure to the head end of the cylinder to advance the piston, a normally closed flow control valve having connections to both input lines so that said input lines are in communication one with the other only when said valve is in an open position, means for supplying both lines simultaneously with fluid under pressure, means to open said valve in response to build-up of pressure in the other input line at the time of piston advancement so that fluid under pressure in the first-named input line flows through said valve to merge with that in the other input line for confluent delivery to the head end of the cylinder to produce rapid forward movement of the piston, said other input line being in communication with a relief valve which in open position drains said other input line, said relief valve being characterized by a variable orifice, and means to vary the orifice of the relief valve from full open to full closed position and positions in between.

19. Apparatus according to claim 18 in which the relief valve includes a pressure responsive poppet and in which the last-named means includes:
  (a) means including a vent line to establish a pressure drop across the relief poppet;
  (b) a vent-control valve for variably restricting the vent line.

20. Apparatus according to claim 19 in which the vent-control valve responds to a signal demanding piston advance, closing the vent line and resulting in closure of the relief valve.

21. Apparatus according to claim 20 in which the cylinder piston actuates a brake for retarding a wheel, means to measure the effectiveness of brake action, and means modifying said signal in accordance with the measure of brake effectiveness.

References Cited
UNITED STATES PATENTS

| | | |
|---|---|---|
| 2,063,244 | 12/1936 | Gulliver. |
| 2,443,642 | 6/1948 | Rockwell _____ 91—436 X |
| 3,168,010 | 2/1965 | Thomas _____ 91—436 X |

DUANE A. REGER, Primary Examiner

U.S. Cl. X.R.

188—1, 153; 91—436